(No Model.)
J. L. POWLES.
DRAFT EQUALIZER.
No. 334,280. Patented Jan. 12, 1886.
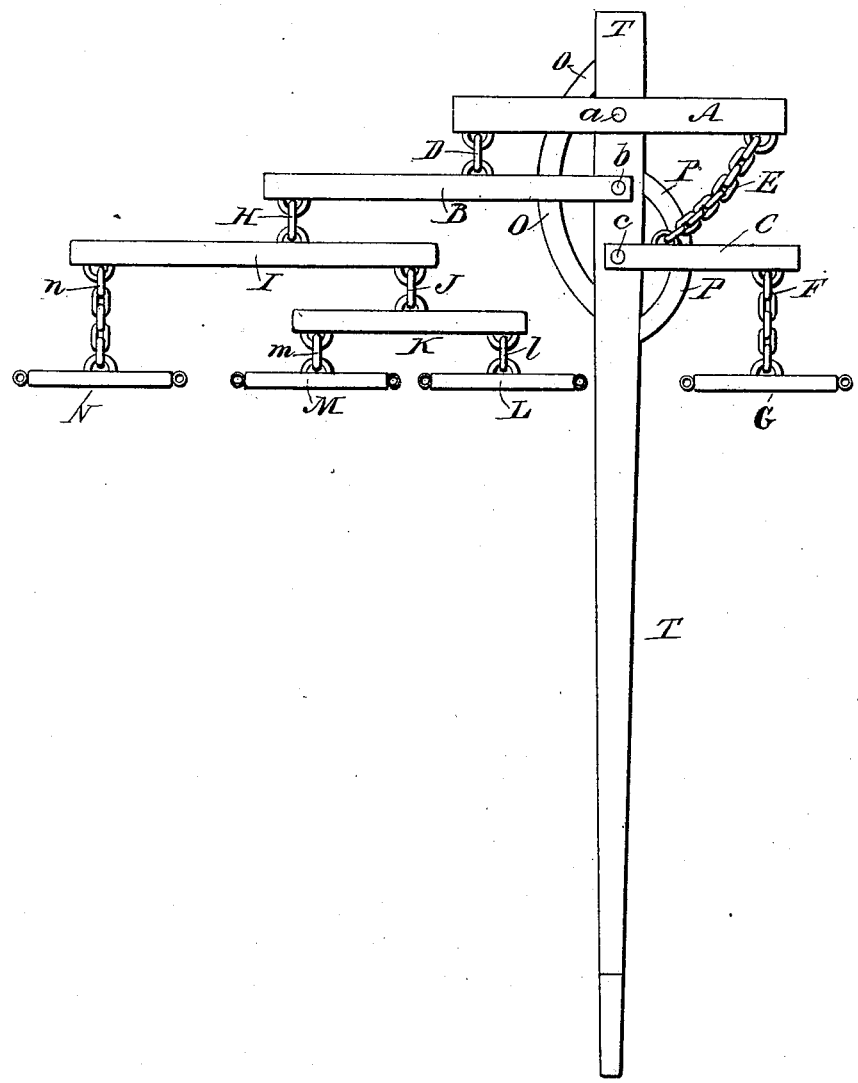
WITNESSES:
INVENTOR:
J. L. Powles
BY Munn & Co
ATTORNEYS.

UNITED STATES PATENT OFFICE.

JOHN L. POWLES, OF GOODLAND, INDIANA.

DRAFT-EQUALIZER.

SPECIFICATION forming part of Letters Patent No. 334,280, dated January 12, 1886.

Application filed November 2, 1885. Serial No. 181,649. (No model.)

*To all whom it may concern:*

Be it known that I, JOHN L. POWLES, of Goodland, in the county of Newton and State of Indiana, have invented a new and Improved Draft-Equalizer, of which the following is a full, clear, and exact description.

My invention relates to draft-equalizers, and has for its object to provide a simple, effective, strong, and durable equalizer, whereby the draft will be made alike for four horses working abreast, and with one horse at one side of the tongue and three horses at the other side of the tongue, and which disposal of the draft-animals is most desirable and economical in operating grain-harvesters and other machines.

The invention consists in certain novel features of construction and combinations of parts of the draft equalizer, all as hereinafter fully set forth.

Reference is to be had to the accompanying drawing, forming a part of this specification, and which is a plan view of a draft-equalizer made in accordance with my invention.

The main evener A is pivoted about centrally, at $a$, to the back part of the tongue T, to which, in front of the evener A, is pivoted, at $b$, the inner end of a lever, B, which extends laterally from the tongue, as shown, on the right-hand or "off" side, and in front of the lever B is pivoted to the tongue, at $c$, the lever C, which extends laterally, as shown, to the left-hand or "nigh" side.

The lever B is connected to one end of the evener A by a link and staple coupling, D, and the other end of the evener is connected by a chain, E, with the lever C, the point of connection of the lever C with the chain E being but one-third the distance from the lever-pivot $c$, or the center of the tongue, that the point of connection of the lever B by the coupling D is from the pivot $b$ of said lever B; hence the leverages of the levers C B are in the proportion of one to three.

To the outer end of the lever C is connected by a link and staple coupling, F, the single-tree G, to which one horse will be hitched, and to the outer end of the lever B is connected, by a link and staple coupling, H, the evener I, to the inner end of which is connected, by a coupling, J, the double-tree K, to the opposite ends of which are coupled, at $l\ m$, the single-trees L M, and to the outer end of the evener I, and at a point twice the distance of the coupling J from the coupling H, is coupled, at $n$, the single-tree N, whereby the draft at the off side of the tongue will be evenly distributed between the three horses to be hitched to the single-trees L M N, respectively.

The single-trees G N are preferably connected to the lever C and evener I, respectively, by means of chain-couplings long enough to bring all four single-trees abreast of or in line with each other, as shown in the drawing.

It is evident that with the described arrangement of the equalizer the draft-strain will be the same for each of the four horses, and but one horse will pull at one side of the tongue, which arrangement is especially desirable in working grain-harvesters, as but one horse travels next the standing grain while the four horses work abreast, and four horses working abreast will do as much work as six horses hitched in three teams working one ahead of the other.

Curved plates O P are fixed to the tongue T, so as to support the levers B C, respectively, and about in line horizontally with each other.

By connecting the chain-coupling E with the lever C farther from or nearer to the lever-pivot $c$, the draft may be adjusted for two, three, four, or more horses, as will readily be understood.

Having thus described my invention, what I claim as new, and desire to secure by Letters Patent, is—

1. A draft-equalizer comprising an evener, A, pivoted to the tongue T, levers B C, pivoted at their inner ends to the tongue, and connected by couplings D E, respectively, to the opposite ends of the evener A, so that their leverages are three to one, as specified, a single-tree, G, coupled to the outer end of lever C, a double-tree, K, coupled to the inner end of evener I, single-trees L M, coupled to opposite ends of said double-tree K, and a single-tree, N, coupled to the outer end of evener I, so as to equalize the draft of three horses on lever B, all substantially as herein set forth.

2. In a draft-equalizer, the combination, with the tongue T, the evener A, and levers B C, pivoted to the tongue and coupled substantially as specified, of the plates O P, fixed to the tongue and supporting the levers, substantially as herein set forth.

JOHN L. POWLES.

Witnesses:
A. T. McCURRY,
F. E. NECK.